US012629985B2

(12) United States Patent
Kim et al.

(10) Patent No.: US 12,629,985 B2
(45) Date of Patent: May 19, 2026

(54) THERMAL MANAGEMENT SYSTEM FOR A VEHICLE

(71) Applicants: HYUNDAI MOTOR COMPANY, Seoul (KR); KIA CORPORATION, Seoul (KR)

(72) Inventors: Jong Won Kim, Cheonan-si (KR); Wan Je Cho, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 114 days.

(21) Appl. No.: 18/630,203

(22) Filed: Apr. 9, 2024

(65) Prior Publication Data

US 2025/0222743 A1 Jul. 10, 2025

(30) Foreign Application Priority Data

Jan. 8, 2024 (KR) ........................ 10-2024-0002696

(51) Int. Cl.
B60H 1/00 (2006.01)

(52) U.S. Cl.
CPC ..... B60H 1/00885 (2013.01); B60H 1/00278 (2013.01); B60H 1/00485 (2013.01);
(Continued)

(58) Field of Classification Search
CPC ............ B60H 1/00885; B60H 1/00278; B60H 1/00485; B60H 1/00921; B60H 2001/00307; B60H 2001/00928; B60H 1/32281; B60H 1/00899; B60H 1/143; B60H 1/2221; B60H 1/3213;
(Continued)

(56) References Cited

U.S. PATENT DOCUMENTS 4,086,072 A * 4/1978 Shaw ...................... F04C 18/16
62/235.1
6,059,016 A * 5/2000 Rafalovich ............. F28D 20/02
165/41
(Continued)

FOREIGN PATENT DOCUMENTS

EP 4385775 A1 * 6/2024 ......... H01M 10/613
KR 20220043382 A * 4/2022 ........ B60H 1/00278
(Continued)

*Primary Examiner* — Ljiljana V. Ciric
(74) *Attorney, Agent, or Firm* — Lempia Summerfield Katz LLC

(57) ABSTRACT

A thermal management system for a vehicle includes a refrigerant circuit having an accumulator, a compressor, a refrigerant-air heat exchanger, a first expansion valve, and an evaporator. The thermal management system further including a heating system that is composed of a water pump, a coolant heater, and a heater core. The system further including a branch refrigerant line that is branched from a refrigerant line between the compressor and the refrigerant-air heat exchanger, a refrigerant-coolant heat exchanger wherein heat exchange is performed between a refrigerant and a coolant, a second expansion valve that is installed on the branch refrigerant line, and a first control valve installed at a branch point where the branch refrigerant line is branched from the refrigerant line between the compressor and the refrigerant-air heat exchanger.

14 Claims, 7 Drawing Sheets

(52) U.S. Cl.
    CPC .................... *B60H 1/00921* (2013.01); *B60H 2001/00307* (2013.01); *B60H 2001/00928* (2013.01)

(58) Field of Classification Search
    CPC ...... B60Y 2200/91; F25B 41/20; F25B 41/31; F25B 41/42
    See application file for complete search history.

(56) References Cited

U.S. PATENT DOCUMENTS

| | | | | |
|---|---|---|---|---|
| 6,124,644 | A * | 9/2000 | Olson | B60L 3/0023 |
| | | | | 180/65.245 |
| 6,347,528 | B1 * | 2/2002 | Iritani | B60H 1/3207 |
| | | | | 62/434 |
| 6,464,027 | B1 * | 10/2002 | Dage | F01P 3/20 |
| | | | | 123/41.14 |
| 6,569,550 | B2 * | 5/2003 | Khelifa | B60H 1/323 |
| | | | | 429/434 |
| 6,915,649 | B2 * | 7/2005 | Amaral | B60H 1/00907 |
| | | | | 62/434 |
| 7,789,176 | B2 * | 9/2010 | Zhou | B60H 1/00885 |
| | | | | 180/65.1 |
| 7,841,431 | B2 * | 11/2010 | Zhou | B60L 58/26 |
| | | | | 180/65.1 |
| 8,910,489 | B2 * | 12/2014 | Choi | B60H 1/143 |
| | | | | 62/185 |
| 9,895,956 | B2 * | 2/2018 | Satou | F25B 5/02 |
| 9,944,152 | B2 * | 4/2018 | Kim | B60H 1/00428 |
| 10,183,544 | B2 * | 1/2019 | Kim | F25B 25/005 |
| 10,183,549 | B2 * | 1/2019 | Koberstein | B60H 1/00385 |
| 10,252,599 | B2 * | 4/2019 | Kim | B60H 1/00278 |
| 10,343,483 | B2 * | 7/2019 | Kim | B60H 1/00278 |
| 10,486,493 | B2 * | 11/2019 | Kim | B60H 1/32284 |
| 10,625,563 | B2 * | 4/2020 | Kim | B60H 1/00885 |
| 10,677,500 | B2 * | 6/2020 | Kim | F25B 25/005 |
| 10,967,702 | B2 * | 4/2021 | Mancini | B60H 1/00564 |
| 10,974,566 | B2 * | 4/2021 | Kim | B60H 1/00921 |
| 11,007,850 | B2 * | 5/2021 | Kim | B60H 1/00921 |
| 11,065,934 | B2 * | 7/2021 | Lee | B60H 1/00328 |
| 11,072,259 | B2 * | 7/2021 | Gonze | B60H 1/00385 |
| 11,110,808 | B2 * | 9/2021 | Lee | B60H 1/00 |
| 11,142,037 | B2 * | 10/2021 | Kim | B60H 1/143 |
| 11,155,138 | B2 * | 10/2021 | Kim | B60H 1/00428 |
| 11,186,137 | B2 * | 11/2021 | Kim | B60H 1/32284 |
| 11,207,939 | B2 * | 12/2021 | Johnston | B60H 1/143 |
| 11,207,941 | B2 * | 12/2021 | Lee | B60H 1/00385 |
| 11,214,116 | B2 * | 1/2022 | Kim | B60H 1/143 |
| 11,318,816 | B2 * | 5/2022 | Kim | B60H 1/3213 |
| 11,325,444 | B2 * | 5/2022 | Kim | B60H 1/3227 |
| 11,390,141 | B2 * | 7/2022 | Kim | B60H 1/00885 |
| 11,394,063 | B2 * | 7/2022 | Bae | H01M 10/625 |
| 11,407,273 | B2 * | 8/2022 | Kim | B60H 1/00271 |
| 11,446,979 | B2 * | 9/2022 | He | B60H 1/00899 |
| 11,458,811 | B2 * | 10/2022 | Kim | B60H 1/32284 |
| 11,458,812 | B2 * | 10/2022 | Jeong | B60H 1/00921 |
| 11,479,076 | B2 * | 10/2022 | Kim | B60H 1/143 |
| 11,479,077 | B2 * | 10/2022 | Kim | B60H 1/32284 |
| 11,505,034 | B2 * | 11/2022 | Kim | B60H 1/00278 |
| 11,505,038 | B2 * | 11/2022 | Kim | B60H 1/00899 |
| 11,506,306 | B2 * | 11/2022 | Schoeneman | F16K 49/005 |
| 11,571,948 | B2 * | 2/2023 | Kim | B60H 1/32284 |
| 11,602,977 | B2 * | 3/2023 | Kim | B60H 1/3227 |
| 11,613,163 | B2 * | 3/2023 | Kim | B60H 1/00278 |
| | | | | 62/196.1 |
| 11,613,164 | B2 * | 3/2023 | Kim | B60H 1/00278 |
| | | | | 62/185 |
| 11,760,153 | B2 * | 9/2023 | Kim | B60H 1/00921 |
| | | | | 165/41 |
| 11,766,920 | B2 * | 9/2023 | Turudic | B60H 1/00385 |
| | | | | 165/201 |
| 11,794,550 | B2 * | 10/2023 | Kim | B60H 1/00278 |
| 11,807,066 | B2 * | 11/2023 | Hwang | B60H 1/00878 |
| 11,870,045 | B2 * | 1/2024 | Kim | H01M 10/6569 |
| 11,898,657 | B2 * | 2/2024 | Schoeneman | F01P 7/165 |
| 12,059,943 | B2 * | 8/2024 | Jeong | B60H 1/00485 |
| 12,083,856 | B2 * | 9/2024 | He | B60H 1/00485 |
| 12,083,861 | B2 * | 9/2024 | Kim | B60H 1/00921 |
| 12,090,816 | B2 * | 9/2024 | Kim | B60H 1/00328 |
| 12,097,754 | B2 * | 9/2024 | Hwang | B60H 1/3229 |
| 12,115,839 | B2 * | 10/2024 | Kim | B60H 1/00271 |
| 12,122,213 | B2 * | 10/2024 | He | B60H 1/00278 |
| 12,122,218 | B2 * | 10/2024 | You | B60H 1/00485 |
| 12,128,736 | B2 * | 10/2024 | Cho | B60H 1/00278 |
| 12,172,493 | B2 * | 12/2024 | Jeong | B60H 1/00385 |
| 12,214,644 | B2 * | 2/2025 | Heyl | F25B 9/008 |
| 12,220,966 | B2 * | 2/2025 | Kim | B60H 1/143 |
| 12,227,055 | B2 * | 2/2025 | Jeong | B60H 1/00278 |
| 12,233,686 | B2 * | 2/2025 | Jeong | B60H 1/32284 |
| 12,240,291 | B2 * | 3/2025 | Lee | B60H 1/00899 |
| 12,280,633 | B2 * | 4/2025 | Jeong | B60H 3/024 |
| 12,311,739 | B2 * | 5/2025 | Kim | B60H 1/32284 |
| 12,313,304 | B2 * | 5/2025 | Munk | F25B 13/00 |
| 12,370,865 | B2 * | 7/2025 | Cho | B60H 1/00278 |
| 2012/0318012 | A1 * | 12/2012 | Choi | B60H 1/00921 |
| | | | | 62/238.7 |
| 2013/0283838 | A1 * | 10/2013 | Kadle | F28D 9/0093 |
| | | | | 62/509 |
| 2014/0069123 | A1 * | 3/2014 | Kim | B60H 1/00921 |
| | | | | 165/59 |
| 2014/0260392 | A1 * | 9/2014 | Hawkins | F24D 17/02 |
| | | | | 62/238.6 |
| 2015/0285539 | A1 * | 10/2015 | Kopko | F25B 41/39 |
| | | | | 62/324.1 |
| 2016/0082805 | A1 * | 3/2016 | Graaf | B60H 1/04 |
| | | | | 62/238.7 |
| 2016/0116192 | A1 * | 4/2016 | Kim | B60H 3/024 |
| | | | | 62/115 |
| 2023/0173883 | A1 * | 6/2023 | Jeong | B60H 3/024 |
| 2023/0302872 | A1 * | 9/2023 | Lee | B60H 1/3223 |
| 2023/0349605 | A1 * | 11/2023 | Kim | F25B 41/30 |
| 2024/0034123 | A1 * | 2/2024 | Kim | B60H 1/00278 |
| 2024/0174053 | A1 * | 5/2024 | Kim | B60H 1/00921 |
| 2024/0190210 | A1 * | 6/2024 | Michikawauchi | B60H 1/32284 |
| 2024/0213582 | A1 * | 6/2024 | Seo | H01M 8/04029 |
| 2024/0375484 | A1 * | 11/2024 | Lee | B60H 1/00485 |
| 2024/0399819 | A1 * | 12/2024 | Enokijima | F25B 1/00 |
| 2025/0058603 | A1 * | 2/2025 | Jeong | F25B 9/008 |
| 2025/0074139 | A1 * | 3/2025 | Jeong | B60H 1/00278 |
| 2025/0074157 | A1 * | 3/2025 | Jeong | H01M 10/63 |
| 2025/0128570 | A1 * | 4/2025 | Kim | B60H 1/00885 |
| 2025/0135843 | A1 * | 5/2025 | Lee | B60H 1/32 |
| 2025/0153538 | A1 * | 5/2025 | Kim | B60H 1/00921 |
| 2025/0222743 | A1 * | 7/2025 | Kim | B60H 1/00278 |
| 2025/0301613 | A1 * | 9/2025 | Miyoshi | H05K 7/20327 |

FOREIGN PATENT DOCUMENTS

| | | | | |
|---|---|---|---|---|
| KR | 20230062524 | A | 5/2023 | |
| KR | 20240012157 | A * | 1/2024 | B60H 1/00485 |
| KR | 102703181 | B1 * | 9/2024 | B60H 1/00392 |

* cited by examiner

THERMAL MANAGEMENT SYSTEM FOR A VEHICLE

CROSS REFERENCE TO RELATED APPLICATION

This application claims priority to Korean Patent Application No. 10-2024-0002696, filed on Jan. 8, 2024, the entire contents of which are incorporated herein for all purposes by this reference.

BACKGROUND

Technical Field

The present disclosure relates to a thermal management system for a vehicle having a new, simplified configuration capable of reducing a quantity of components required and improving performance, due to a simple configuration.

Description of the Related Art

In general, a thermal management system is included in automobiles in order to perform thermal management for an entire vehicle. The thermal management system manages the energy required for controlling the vehicle's interior heating, ventilating, and air conditioning (HVAC), cooling power electronics (PE) systems, and cooling or heating a battery.

The thermal management system of the vehicle can be broadly defined as a system that includes an air conditioning system and a heating system for heating ventilation and air conditioning (HVAC), a heat pump system, and a temperature control system that uses a coolant or a refrigerant for thermal management such as cooling or heating components and devices of a battery or power system.

Generally, a thermal management system includes a compressor, a water-cooled condenser (WCC), a chiller, an external condenser (an air-cooled condenser), an internal heat exchanger (IHX), an expansion valve, and the like.

An internal an condenser, evaporator, and an accumulator, for example, may be included in the internal heat exchanger (IHX). In addition, an accumulator, a compressor, an external condenser, an expansion valve, and an evaporator may constitute a general air conditioning system in the thermal management system.

Thermal management systems can operate in a heating mode where heated air is supplied to the interior of the vehicle, a cooling mode where cooled air is supplied to the interior of the vehicle (an air conditioning mode), and a dehumidifying mode that removes moisture from the interior of the vehicle.

In the heating mode, a refrigerant and an electric heater (e.g., a PTC heater) can be used in order to achieve interior heating. Alternatively, a high-temperature refrigerant can be used without the operation of an electric heater when the refrigerant temperature is sufficiently high in order to perform interior heating.

In addition, a mode (COP=1) to supply heat for interior heating can be performed using compressor work in an extremely cold outdoor condition where it is difficult to use a heat pump system or in a condition where it is difficult to recover waste heat from a battery or a power electronics (PE) system (e.g., a Tesla® vehicle operating in a lossy mode; hereinafter "Tesla® Lossy mode").

When a heating mode such as Tesla® Lossy mode is operated, the high-temperature refrigerant compressed by the compressor passes through the internal heat exchanger and at the same time air passes around the internal heat exchanger, so that the air heated in the internal heat exchanger by the high-temperature refrigerant is supplied into the interior of the vehicle.

While the high-temperature refrigerant and air pass through the internal heat exchanger, heat exchange between the refrigerant and air occurs and the heat of the refrigerant transfers to the air, thereby supplying the air heated by such heat exchange into the interior of the vehicle (interior heat dissipation) and then achieving interior heating without the operation of an electric heater.

Although it is possible to use a high-temperature and high-pressure refrigerant compressed by a compressor as a heat source to supply heat for interior heating instead of an electric heater (e.g., a PTC heater), generally, in a thermal management system that utilizes compressor work in the heating mode, it is not possible to supply compressor work which diverges from 'COP (Coefficient of Performance)=1', and there would be heat loss in heat transfer since both a refrigerant and a coolant should be used.

In other words, since a separate heat transfer medium such as a coolant is required to supply additional heating calorific value during the heating mode, heat loss in heat transfer can occur and there is a disadvantage in that a separate coolant circulation process is required to implement the mode.

In addition, although compressor work (=load) is used to supply a heating calorific value of the thermal management system when heating, there is a limitation in that only the compressor speed (RPM) should be increased in order to secure a sufficient heating calorific value through compressor work, eventually resulting in problems of generating compressor noise and shortening lifespan due to the high-speed operation.

In addition, when using only compressor work for heating in the thermal management system, there is a limitation of the heating performance due to a lack of a heat source for heating and it takes a lot of time to obtain the sufficient heating calorific value.

Also, in the case of the heat pump system used in electric vehicles, an external heat source is used as a heat source for heating to secure the AER (All Electric Range) of electric vehicles, and it is possible to save energy consumption by using a heat pump system, but there is a burden of production costs when applying to light vehicles due to an increase in the number of component elements of a vehicle.

In order to secure the competitiveness of electric vehicles, it is essential to reduce production costs while achieving or maintaining the basic thermal management performance of the vehicle in the thermal management system.

In addition, it is desired to develop a technology that can reduce the number of components included in a thermal management system while maintaining the basic performance of the thermal management system. From this perspective, vehicle manufacturers urgently need to take the lead in new thermal management technologies. Although thermal management systems are excellent in terms of performance, they have limitations in terms of reducing the number of components required to implement the heat pump.

SUMMARY

The present disclosure, devised to solve the above problems, provides a thermal management system for a vehicle, which is capable of reducing production costs while having excellent cooling and heating performance.

The objectives of the present disclosure are not limited to the above-mentioned objectives. Other objectives not mentioned above should be clearly understood by those having ordinary skill in the art to which the present disclosure pertains (hereinafter referred to as 'those having ordinary skill in the art') from the description below.

To achieve the above objectives, the thermal management system of the vehicle according to an embodiment of the present disclosure may include a refrigerant circuit that includes an accumulator, a compressor, a refrigerant-air heat exchanger, a first expansion valve, and an evaporator which are connected to each other via a refrigerant line in order for a refrigerant to pass therethrough and circulate between the accumulator, the compressor, the refrigerant-air heat exchanger, the first expansion valve, and the evaporator. The thermal management system further includes: a heating system having a water pump, a coolant heater, and a heater core which are connected to each other via a coolant line for a coolant to pass therethrough and circulate between the water pump, the coolant heater, and the heater core; a branch refrigerant line that is branched from a refrigerant line between the compressor and the refrigerant-air heat exchanger and is connected to the refrigerant line between the refrigerant-air heat exchanger and a first expansion valve; and a refrigerant-coolant heat exchanger connected to the branch refrigerant line and the coolant line of the heating system. In particular, heat exchange is performed between the refrigerant flowing along the branch refrigerant line and the coolant flowing along the coolant line. The thermal management system further includes: a second expansion valve that is installed on the branch refrigerant line between the refrigerant-coolant heat exchanger and the refrigerant-air heat exchanger; and a first control valve that is installed at a branch point where the branch refrigerant line is branched from the refrigerant line between the compressor and the refrigerant-air heat exchanger.

Herein, the second expansion valve may be installed in the branch refrigerant line between the refrigerant-coolant heat exchanger and a branch point where the branch refrigerant line is branched from the refrigerant line between the refrigerant-air heat exchanger and the first expansion valve.

In addition, the thermal management system of the vehicle according to an embodiment of the present disclosure may further include: a first branch line that is branched from the refrigerant line between the evaporator and the accumulator and is connected to the refrigerant line between the compressor and the refrigerant-air heat exchanger; and a second control valve that is installed at a branch point where the first branch line is branched from the refrigerant line. The thermal management system further includes: a second branch line that is branched from the refrigerant line between the second control valve and the accumulator and then is connected to the first branch line; and a third control valve that is installed at a branch point where the second branch line is branched from the refrigerant line.

In addition, the thermal management system of the vehicle according to an embodiment of the present disclosure may further include: a third branch line that is branched from the branch refrigerant line between the refrigerant-coolant heat exchanger and the first control valve and is connected to the refrigerant line between the second control valve and the third control valve.

In addition, the thermal management system of the vehicle according to an embodiment of the present disclosure may further include: a controller that controls operations of the first expansion valve, the second expansion valve, the first control valve, the second control valve, and the third control valve.

In addition, in the thermal management system of the vehicle according to an embodiment of the present disclosure, in a simultaneous heating and dehumidifying mode, the controller may control the open/closed state of the first control valve in order to allow all of the refrigerant compressed by the compressor to move to the branch refrigerant line and pass through the refrigerant-coolant heat exchanger, control both the first and second expansion valves to be in an open state in order to allow the refrigerant having passed through the refrigerant-coolant heat exchanger to be distributed to the refrigerant-air heat exchanger and the evaporator after expanding while passing through the second expansion valve, and operate a water pump of the heating system, a cooling fan that passes air through the refrigerant-air heat exchanger, and an HVAC blower that blows air to pass through the heater core and the evaporator.

In addition, in the thermal management system of the vehicle according to an embodiment of the present disclosure, in the simultaneous heating and dehumidifying mode, the controller may control the open/closed state of the second control valve and the third control valve so that the refrigerant passing through the refrigerant-air heat exchanger and the refrigerant passing through the evaporator and the second control valve join at the third branch line and then move to the refrigerant line through the third control valve.

In addition, the thermal management system of the vehicle according to an embodiment of the present disclosure may further include a controller that controls operations of the first expansion valve, the second expansion valve, and the first control valve in the heating mode, wherein the controller controls the open/closed state of the first control valve in order to allow all of the refrigerant compressed by the compressor to move to the branch refrigerant line and then pass through the refrigerant-coolant heat exchanger, controls the first expansion valve to be in a closed state in order to prevent the refrigerant from passing therethrough, controls the second expansion valve for the refrigerant to pass therethrough and expand, and operates the water pump of the heating system, a cooling fan that passes air through the refrigerant-air heat exchanger and an HVAC blower that blows air to pass through the heater core.

In addition, the thermal management system of the vehicle according to an embodiment of the present disclosure may further include a controller that controls operations of the first expansion valve, the second expansion valve, and the first control valve in the cooling mode, wherein the controller controls the open/closed state of the first control valve in order to allow all of the refrigerant compressed by the compressor to move along the refrigerant line and pass through the refrigerant-air heat exchanger, controls the first expansion valve for the refrigerant to pass through and expand, controls the second expansion valve to be in a closed state in order to prevent the refrigerant from passing therethrough, and operates a cooling fan that passes air through the refrigerant-air heat exchanger and an HVAC blower that blows air to pass through the evaporator while the refrigerant circulates in the path of the accumulator, the compressor, the refrigerant-air heat exchanger, the first expansion valve, and the evaporator.

In addition, the thermal management system of the vehicle according to an embodiment of the present disclosure may further include a power electronics (PE) thermal management system that includes a water pump connected through a PE coolant line in order to allow coolant to pass therethrough and circulate, a PE coolant passage provided in component elements or devices of a power electronic system, and a radiator.

In addition, the thermal management system of the vehicle according to an embodiment of the present disclosure may further include a coolant connection line that connects the heating system and the PE thermal management system, wherein the coolant connection line is branched from the coolant line between the heater core and the refrigerant-coolant heat exchanger and is connected to the PE coolant line between the PE coolant passage and the radiator.

In addition, the thermal management system of the vehicle according to an embodiment of the present disclosure may further include a coolant branch line that is branched from the coolant line between the coolant heater and the heater core, and a valve device that is connected to the coolant branch line, to the coolant line connected from the refrigerant-coolant heat exchanger, to the inlet side of the water pump of the heating system, to the inlet side of the water pump of the PE thermal management system, and to the PE coolant line of the radiator outlet side connected from the radiator of the PE thermal management system and that is configured to selectively perform connection between the coolant branch line, the coolant line, the inlet side of the water pump of the PE management system, and the PE coolant line.

In addition, the thermal management system of the vehicle according to an embodiment of the present disclosure may further include a battery coolant passage provided in the battery in order to allow coolant to pass through for thermal management of the battery, wherein the battery coolant passage is connected to the coolant line of the heating system and the coolant circulating along the coolant line may pass through the battery coolant passage.

In addition, the thermal management system of the vehicle according to an embodiment of the present disclosure may further include a controller that controls operations of the first expansion valve, the second expansion valve, and the first control valve, wherein, in a simultaneous cooling and battery cooling mode, the controller controls the open/closed state of the first control valve in order to allow all of the refrigerant compressed by the compressor to move along the refrigerant line and pass through the refrigerant-air heat exchanger, controls the first expansion valve and the second expansion valve for the refrigerant to pass therethrough and expand, and operates the water pump of the heating system, a cooling fan that passes air through the refrigerant-air heat exchanger, and an HVAC blower that blows air to pass through the evaporator while the refrigerant circulates in the path of the accumulator, the compressor, the refrigerant-air heat exchanger, the first expansion valve, and the evaporator as well as in the path of the branch refrigerant line and the refrigerant-coolant heat exchanger.

The thermal management system of the vehicle according to the present disclosure may be applied in order to secure the price competitiveness of electric vehicles and may be provided as an economical thermal management circuit capable of reducing production costs while implementing cooling and heating performance.

In particular, provided may be a new configuration of a thermal management system capable of implementing a heat pump that absorbs and supplies heat from the outside air even after removing an internal heat exchanger in order to reduce production costs and capable of securing heat sources for heating through a coolant heater without an electric heater, such as a PTC heater.

DETAILED DESCRIPTION OF THE DISCLOSURE

Figure 1:
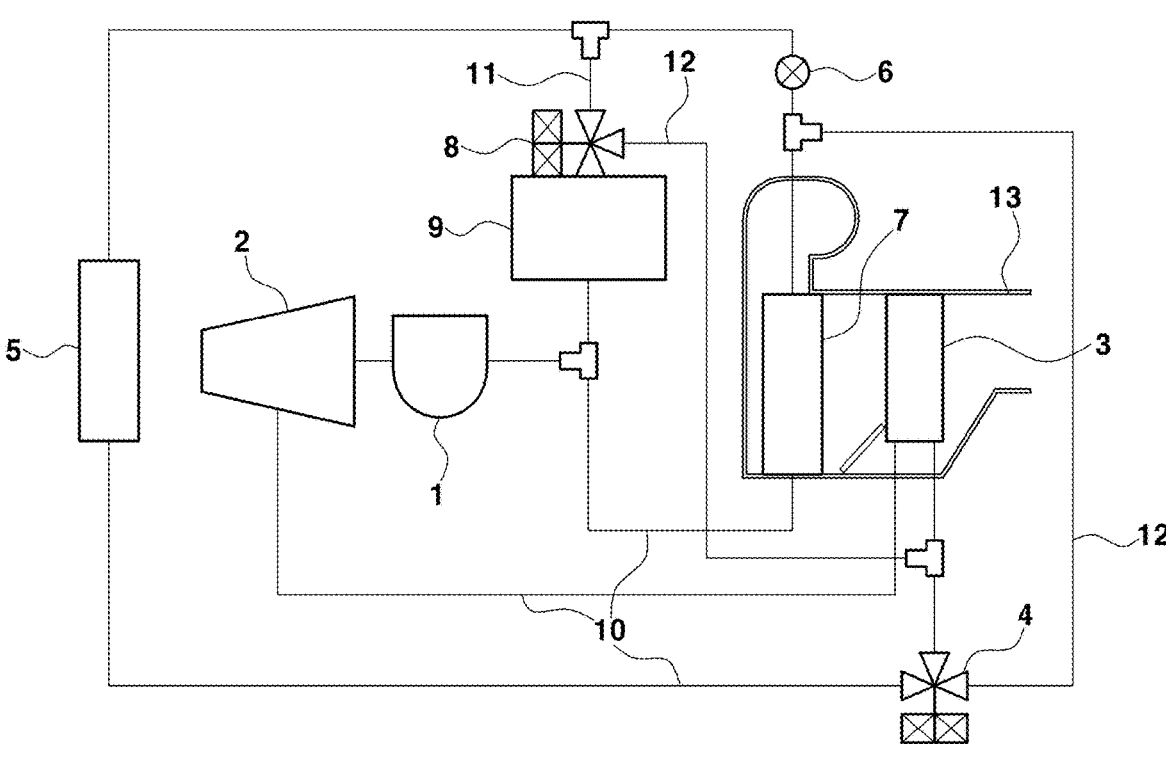
FIG. 1 is a circuit diagram showing a thermal management system.

Hereinafter, embodiments of the present disclosure are described in detail with reference to the accompanying drawings. Specific structural or functional descriptions presented in the embodiments of the present disclosure are illustrated only for the purpose of describing the embodiments according to the inventive concept of the present disclosure. Embodiments according to the inventive concept of the present disclosure may be implemented in various forms. In addition, the present disclosure should not be construed as being limited by the embodiments described in the present specification. Instead, the present disclosure should be understood to include all modifications, equivalents or substitutes included in the spirit and technical scope of the present inventive concept.

Additionally, in the present disclosure, terms such as a first and/or a second may be used to describe various components, but the above components are not limited by the above terms. The terms are intended only to distinguish one component from another components and, for example, the first component may be referred to as the second component and similarly the second component may be referred to as the first component without departing from the scope of rights according to the concept of the present disclosure.

When it is stated that a component is "connected" or "linked" to another component, it should be understood that it may be directly connected or linked to that other component, but that another component may exist in between. On the other hand, when it is stated that one component is "directly connected" or "directly linked" to another component, it should be understood that another component does not exist in between. Other expressions to describe relationships between components, such as "between" and "directly between" or "adjacent to" and "directly adjacent to" should be interpreted similarly.

Throughout the specification, the same reference numerals denote the same components. The terms used herein are for describing embodiments and are not intended to limit the present disclosure. In the present specification, the singular form includes the plural form as well unless specifically mentioned in the phrase. As used in the specification, "comprises" and/or "comprising" does not exclude the presence or addition of one or more other components, steps, operations, and/or elements. When a component, device, element, or the like of the present disclosure is described as having a purpose or performing an operation, function, or the like, the component, device, or element should be considered herein as being "configured to" meet that purpose or perform that operation or function.

The present disclosure relates to a new configuration of a thermal management system that may reduce production costs and reduce the number of components included in the thermal management system by removing an electric heater such as the PTC heater and an internal heat exchanger while having excellent cooling and heating performance. Additionally, a thermal management system according to the present disclosure may secure additional heat sources for heating through a heat pump even when the PTC heater and internal heat exchanger are removed.

First, a thermal management system is briefly described before explaining embodiments of the present disclosure in order to help understand the present disclosure.

FIG. 1 is a circuit diagram showing a thermal management system. FIG. 1 shows a refrigerant circuit that includes an internal condenser 3 among the components of the thermal management system. As shown, the refrigerant circuit may include an accumulator 1, a compressor 2, an internal condenser 3, an external condenser 5, an expansion valve 6, and an evaporator 7 in order for the refrigerant to sequentially pass through. These components of the refrigerant circuit may be connected through a refrigerant line 10 so that the refrigerant may sequentially pass through the accumulator 1, the compressor 2, the internal condenser 3, the external condenser 5, the expansion valve 6, and the evaporator 7 and circulate.

In the refrigerant circuit, a chiller 9 may be a heat exchanger in which heat exchange between the refrigerant and the coolant is performed and may be installed in the middle of a chiller refrigerant line 11 branched from the refrigerant line 10. A coolant line (not shown) may be connected to the chiller 9 for heat exchange between the refrigerant and the coolant. The coolant that has finished heat exchange with the refrigerant in the chiller 9 may be used to cool other components while circulating along the coolant line.

In addition, a separate expansion valve 8 to expand the refrigerant flowing into the chiller may be installed at the front end (an inlet side, an upstream side) of the chiller based on the refrigerant circulation path so that some of the refrigerant passing through the external condenser 5 may expand to a low-temperature and low-pressure state and then pass through the chiller 9.

In addition, an HVAC case 13 may be provided to allow the air for HVAC (inside air and outside air) supplied by an HVAC blower (not shown) to pass through. The internal condenser 3 and the evaporator 7 may be disposed inside the HVAC case 13.

In addition, the refrigerant line may be connected to allow the refrigerant to pass through the internal condenser 3 and the evaporator 7 and the internal condenser 3 may be disposed at the rear end (an outlet side, a downstream side) of the compressor 2 based on the refrigerant circulation path.

In addition, a separate refrigerant line 12 may be branched from the expansion valve 8 of the front end of the chiller 9 and the branched refrigerant line 12 may be connected to the refrigerant line 10 of the outlet side of the internal condenser 3. In addition, the refrigerant line 10 of the outlet side of the internal condenser 3 may be connected to the inlet side of the external condenser 5.

A separate refrigerant line 12 may be branched from the refrigerant line 10 between the expansion valve 6 and the evaporator 7. The branched refrigerant line 12 may be connected to the refrigerant line 10 between the internal condenser 3 and the external condenser 5 through the valve 4.

In this circuit configuration, the high-temperature and high-pressure refrigerant compressed by the compressor 2 may pass through the internal condenser 3 inside the HVAC case 13 and in the internal condenser 3, heat exchange may occur between the high-temperature and high-pressure refrigerant passing through the inside and the air for HVAC that is supplied by the HVAC blower while passing around the surroundings. At this time, the heat of the refrigerant may be transferred to the air for HVAC, and then the air for HVAC heated by the refrigerant may be discharged into the interior of the vehicle, thereby heating the interior of the vehicle.

Although not shown in FIG. 1, a separate heating device, such as an electric heater, for example, a PTC heater, may be installed inside the HVAC case 13 instead of an internal condenser or together with an internal condenser, and the air for HVAC heated by the PTC heater may be discharged into the interior of the vehicle, thereby heating the interior of the vehicle.

Hereinafter, the thermal management system according to an embodiment of the present disclosure is described.

Figure 2:
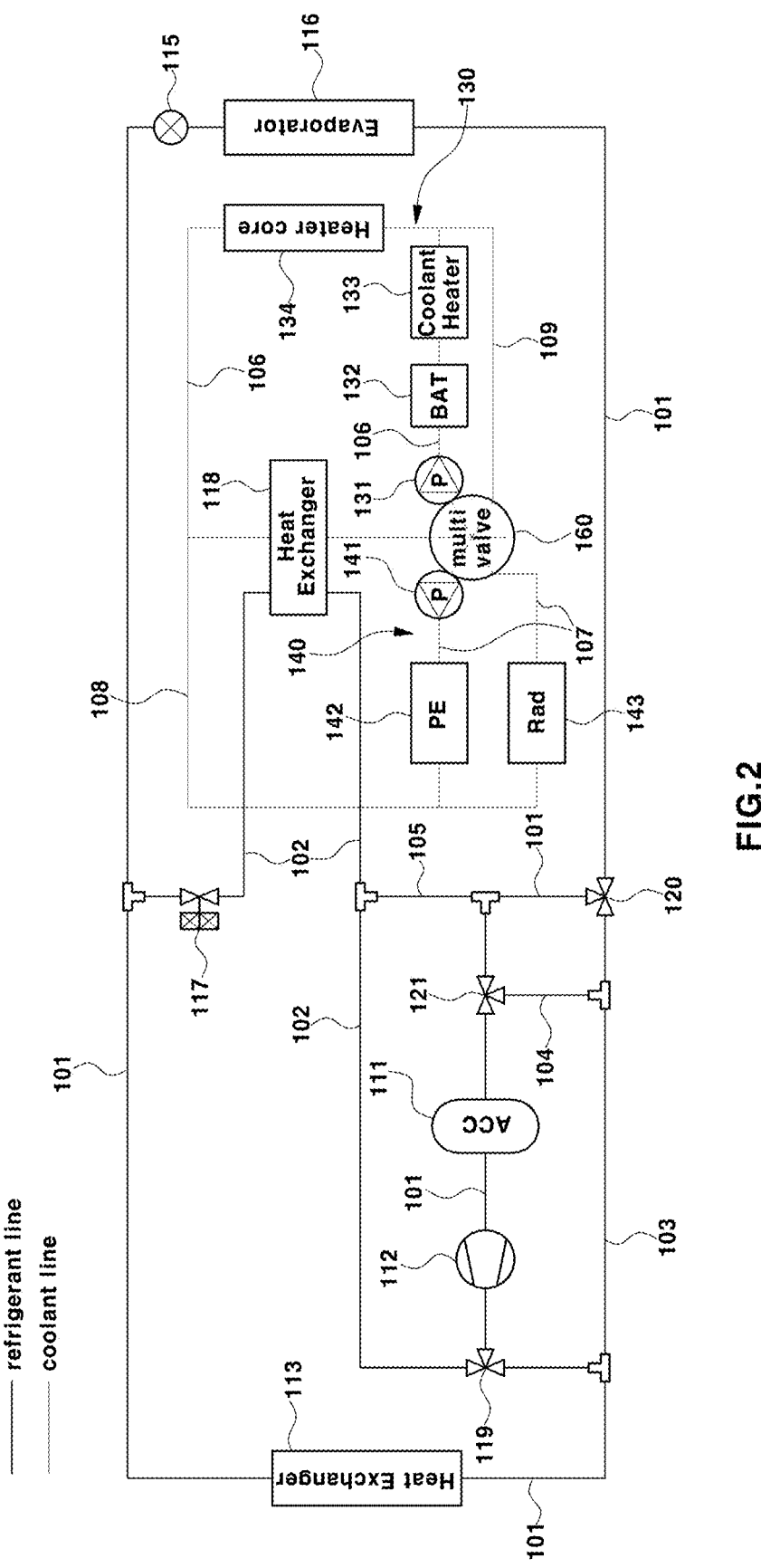
FIG. 2 is a view showing a configuration of a thermal management system according to an embodiment of the present disclosure.
Figure 3:
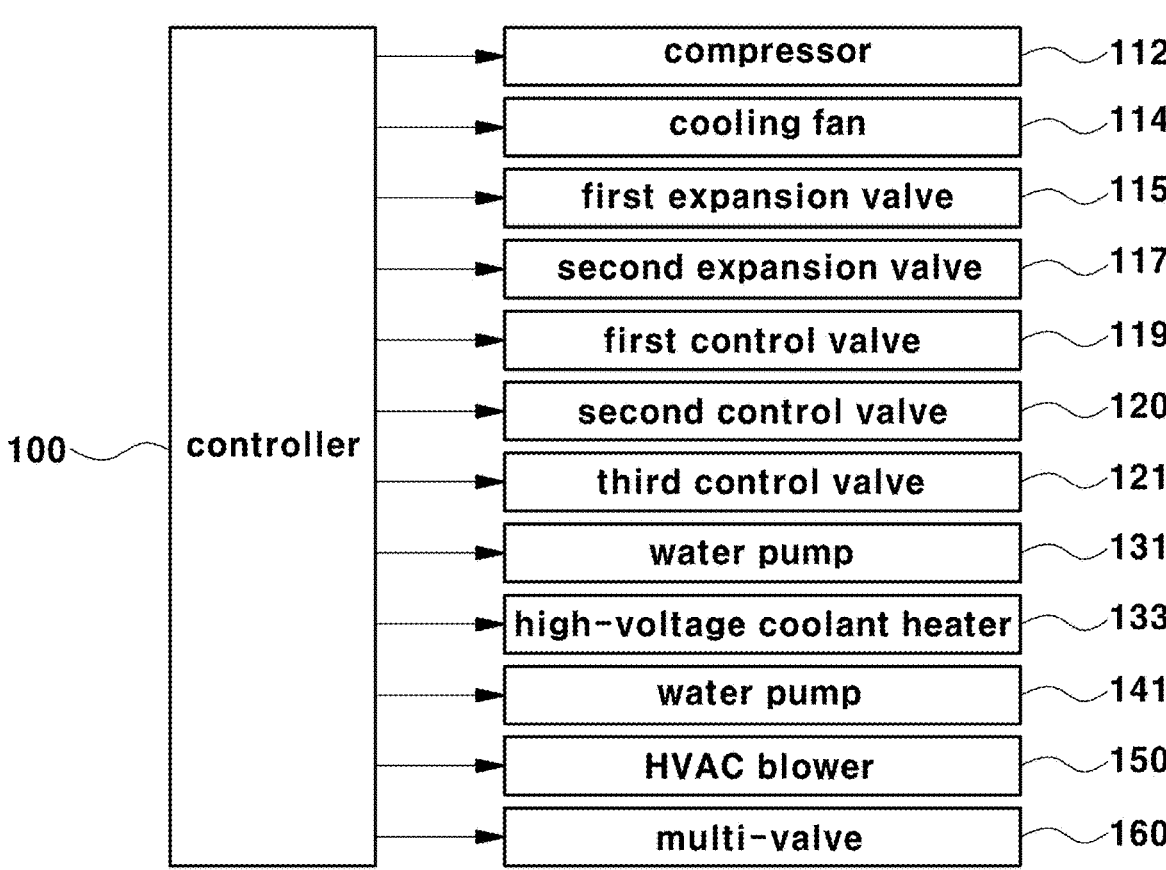
FIG. 3 is a block diagram showing a controller and operating elements in a thermal management system according to an embodiment of the present disclosure.

FIG. 2 is a view showing a configuration of the thermal management system according to an embodiment of the present disclosure and FIG. 3 is a block diagram showing a controller and operating elements in the thermal management system according to an embodiment of the present disclosure.

FIG. 2 shows two cooling circuits in which individual cooling fluid circulates. Specifically, FIG. 2 shows a refrigerant circuit in which air-conditioning refrigerant circulates and a coolant circuit in which a coolant circulates.

The refrigerant circuit may include a compressor 112 that compresses and dispenses the refrigerant at a high temperature and a high pressure, an external heat exchanger 113 (the refrigerant-air heat exchanger) that condenses the refrigerant compressed by the compressor 112 through heat exchange with the air, a first expansion valve 115 that expands the refrigerant condensed and liquefied by the external heat exchanger 113 to a low-temperature and low-pressure state, and an evaporator 116 that cools the air using the latent heat of the refrigerant evaporation while evaporating the refrigerant expanded by the first expansion valve 115.

These components of the refrigerant circuit may be connected through the refrigerant line 101 through which the refrigerant flows, and while circulating along the refrigerant line 101, the refrigerant may sequentially pass through each component of the refrigerant circuit.

Additionally, the refrigerant circuit may further include an accumulator 111 in which a gas-liquid separation of the refrigerant is performed. The accumulator 111 may be installed in the refrigerant line 101 at the front end of the compressor 112 based on the path through which the refrigerant circulates, specifically, in the refrigerant line 101 between the evaporator 116 and the compressor 112, so that only the refrigerant in the gaseous state is supplied to the compressor 112 through the gas-liquid separation, thereby serving to improve the efficiency and durability of the compressor 112.

The refrigerant may pass through the inside of the external heat exchanger 113 (the refrigerant-air heat exchanger), but the air (outside air) sucked in by a cooling fan (the reference numeral '114' in FIG. 3) may pass around the external heat exchanger 113. Accordingly, heat exchange may be performed between the air passing around the external heat exchanger 113 and the refrigerant passing through the inside of the external heat exchanger 113.

In addition, the refrigerant may pass through the inside of the evaporator 116, but the air for HVAC blown by the HVAC blower 150 may usually pass around the evaporator 116. Accordingly, heat exchange may be performed between the air for HVAC passing around the evaporator 116 and the refrigerant passing through the inside of the evaporator 116.

In addition, the refrigerant circuit may further include a branch refrigerant line 102 that is branched from or connected to the refrigerant line 101 between the external heat exchanger 113 and the evaporator 116 (e.g., at a first end) and is connected to the refrigerant line 101 between the compressor 112 and the external heat exchanger 113 (e.g., at a second end), and a refrigerant-coolant heat exchanger 118 that is installed in the middle of the branch refrigerant line 102.

In addition, the refrigerant circuit may include a second expansion valve 117 installed in the middle of the branch refrigerant line 102 that is branched from or connected to the refrigerant line 101 between the external heat exchanger 113 and the evaporator 116 and is connected to the refrigerant-coolant heat exchanger 118, and a first control valve 119 installed at the point where the branch refrigerant line 102 is branched from the refrigerant line 101 between the compressor 112 and the external heat exchanger 113.

The second expansion valve 117 may be located in the middle of the branch refrigerant line 102 between the refrigerant-coolant heat exchanger 118 and a branch point where the branch refrigerant line 102 is branched from the refrigerant line 101 between the external heat exchanger 113 and the first expansion valve 115.

In addition, the refrigerant circuit may further include a first branch line 103 that is branched from the refrigerant line 101 between the evaporator 116 and the accumulator 111 and then is connected to the refrigerant line 101 between the compressor 112 and the external heat exchanger 113, and a second control valve 120 installed at the point where the first branch line 103 is branched from the refrigerant line 101 between the evaporator 116 and the accumulator 111.

In addition, the refrigerant circuit may further include a second branch line 104 that is branched from or connected to the refrigerant line 101 between the second control valve 120 and the accumulator 111 and is connected to the first branch line 103, and a third control valve 121 installed at the point where the second branch line 104 is branched from or connected to the refrigerant line 101 between the second control valve 120 and the accumulator 111.

In such a refrigerant circuit, both the second control valve 120 and the third control valve 121 may be valves installed in the refrigerant line 101 between the evaporator 116 and the accumulator 111. The second control valve 120 may be located at the upstream side closer the evaporator than the third control valve 121 in the refrigerant line 101 between the evaporator 116 and the accumulator 111 on the basis of the refrigerant flow path in the cooling mode.

In this configuration, the refrigerant circuit may further include a third branch line 105 that is branched from or connect to the branch refrigerant line 102 between the refrigerant-coolant heat exchanger 118 and the first control valve 119 and is connected to the refrigerant line 101 between the second control valve 120 and the third control valve 121.

In the present disclosure, the first expansion valve 115 and the second expansion valve 117 may be electronic expansion valves in which an opening/closing operation is controlled according to a control signal output by the controller 100, wherein the refrigerant may selectively pass through the first expansion valve 115 and the second expansion valve 117 according to the controlled open or closed state since the controller 100 controls the open and closed states of the first expansion valve 115 and the second expansion valve 117.

In addition, the second control valve 120, the third control valve 121, and the first control valve 119 may all be electronic 3-way valves whose open or closed state is controlled according to the control signal of the controller 100.

Meanwhile, the refrigerant-coolant heat exchanger 118 may be a heat exchanger in which heat exchange between the refrigerant and the coolant is performed and to this end, the refrigerant-coolant heat exchanger 118 is connected not only to the refrigerant line 102 of the refrigerant circuit (i.e., the branch refrigerant line) in order to allow the refrigerant for heat exchange to pass through, but also to the coolant line 106 of the coolant circuit in order to allow the coolant for heat exchange to pass through.

The coolant circuit may include a heating system 130 that heats the interior of the vehicle using the coolant and a PE thermal management system 140 that performs thermal management for the power electronics (PE) system using the coolant.

The heating system 130 may include a water pump 131 that pumps and expels the coolant, a coolant heater 133 that heats the coolant, a heater core 134 that heats the air for HVAC through heat exchange between the coolant heated by the coolant heater 133 and the air for HVAC, and a coolant line 106 that connects the water pump 131, the coolant heater 133, and the heater core 134 to each other in order to allow the coolant to circulate therebetween.

In addition, the coolant line 106 between the water pump 131 and the coolant heater 133 may be connected to the battery coolant passage (not shown) and the battery coolant passage may be provided to allow the coolant to pass through the battery 132.

Accordingly, the water pump 131, the battery coolant passage, the coolant heater 133, and the heater core 134 may be arranged in order on the basis of the coolant circulation path following the coolant line 106, and the coolant may sequentially pass through the water pump 131, the battery coolant passage, the coolant heater 133, and the heater core 134 in turn while circulating along the coolant line 106.

Referring to FIG. 2, the coolant line 106 on the outlet side of the coolant heater 133 may be connected to the inlet side of the heater core 134 and at this time, the coolant line 106 on the outlet side of the heater core 134 may be connected to the refrigerant-coolant heat exchanger 118. Accordingly, the coolant passing through the heater core 134 may pass through the refrigerant-coolant heat exchanger 118 and may exchange heat with the refrigerant in the refrigerant-coolant heat exchanger 118.

In the heating system 130, the water pump 131 may be an electric water pump (EWP) driven by an electric motor and the driving thereof may be controlled by the controller 100. The coolant heater 133 and the heater core 134 may constitute a vehicle HVAC system along with an air conditioning system that includes an accumulator 111, a compressor 112, an external heat exchanger 113, a first expansion valve 115, and an evaporator 116 in the refrigerant circuit.

The coolant heater 133 may be an electric heater that heats the coolant. Operations of the coolant heater 133 may be also controlled by the controller 100. The coolant heated by the coolant heater 133 may be directed to pass through the heater core 134.

The heater core 134 may be provided to achieve heat exchange between the coolant passing through the inside of the heater core 134 and the air for HVAC passing around the heater core 134. The air for HVAC may be supplied by the HVAC blower (the reference numeral '150' in FIG. 3) and the air for HVAC supplied by the HVAC blower 150 may pass around the heater core 134 while moving along the HVAC case.

In order to heat the interior of the vehicle, heat may be transferred from the high-temperature coolant passing through the inside of the heater core 134 to the air for HVAC passing around the heater core 134. The air heated for HVAC through heat exchange with the coolant while passing through the heater core 134 may be discharged into the interior of the vehicle, thereby achieving interior heating.

The PE thermal management system 140 may basically perform a function of cooling the components or devices 142 of the power electronics system. To this end, the PE thermal management system 140 may include a water pump 141 that pumps and expels coolant, a PE coolant passage (not shown) provided to allow the coolant to pass through the components or devices 142 of the power electronics system, a radiator 143 for heat dissipation of the coolant, and a PE coolant line 107 that connects the water pump 141, the PE coolant passage, and the radiator 143 to each other in order to allow the coolant to circulate therebetween.

Herein, the water pump 141 may be an electric water pump (EWP) driven by an electric motor. The radiator 143 may constitute a cooling module together with a cooling fan (the reference numeral '114' in FIG. 3), wherein the air (outdoor air) sucked by the cooling fan 114 is directed to pass through in the radiator 143, and heat dissipation in which heat from the coolant is released to the air by heat exchange between the coolant and the air may be performed in or at the radiator 143. Operations of the cooling fan 114 may be controlled by the controller 100.

Meanwhile, a separate coolant line 108 may be branched from or connected to the coolant line 106 between the heater core 134 and the refrigerant-coolant heat exchanger 118 and connected to the PE coolant line 107 between the PE coolant passage and the radiator 143. In the following description, the separate coolant line 108 that is branched from the coolant line 106 between the heater core 134 and the refrigerant-coolant heat exchanger 118 is referred to as a coolant connection line. As shown in FIG. 2, the coolant line 106 and the PE coolant line 107 may be connected to each other through the coolant connection line 108.

In addition, a separate coolant line 109 may be branched from or connected to the coolant line 106 between the coolant heater 133 and the heater core 134. This branched separate coolant line 109 may be connected to the electronic multi-valve 160 as a valve device. In the following description, the separate coolant line 109 connected to the multi-valve 160 is referred to as a coolant branch line.

Along with the coolant branch line 109, the multi-valve 160 may be connected to the coolant line 106 connected from the refrigerant-coolant heat exchanger 118, the inlet side of the water pump 131 of the heating system 130, the inlet side of the water pump 141 of the PE thermal management system 140, and the PE coolant line 107 of the outlet side of the radiator 143 connected from the radiator 143.

Operations of the multi-valve 160 may be controlled by the controller 100, the open/closed state of the internal flow paths may be controlled according to the control signal output by the controller 100. At least some of the plurality of the coolant lines connected to the multi-valve 160 may be selectively connected so that the coolant may flow depending on the controlled open/closed state.

Hereinafter, an operating states of the thermal management system according to the present disclosure is described with reference to FIGS. 4-7.

Figure 4:
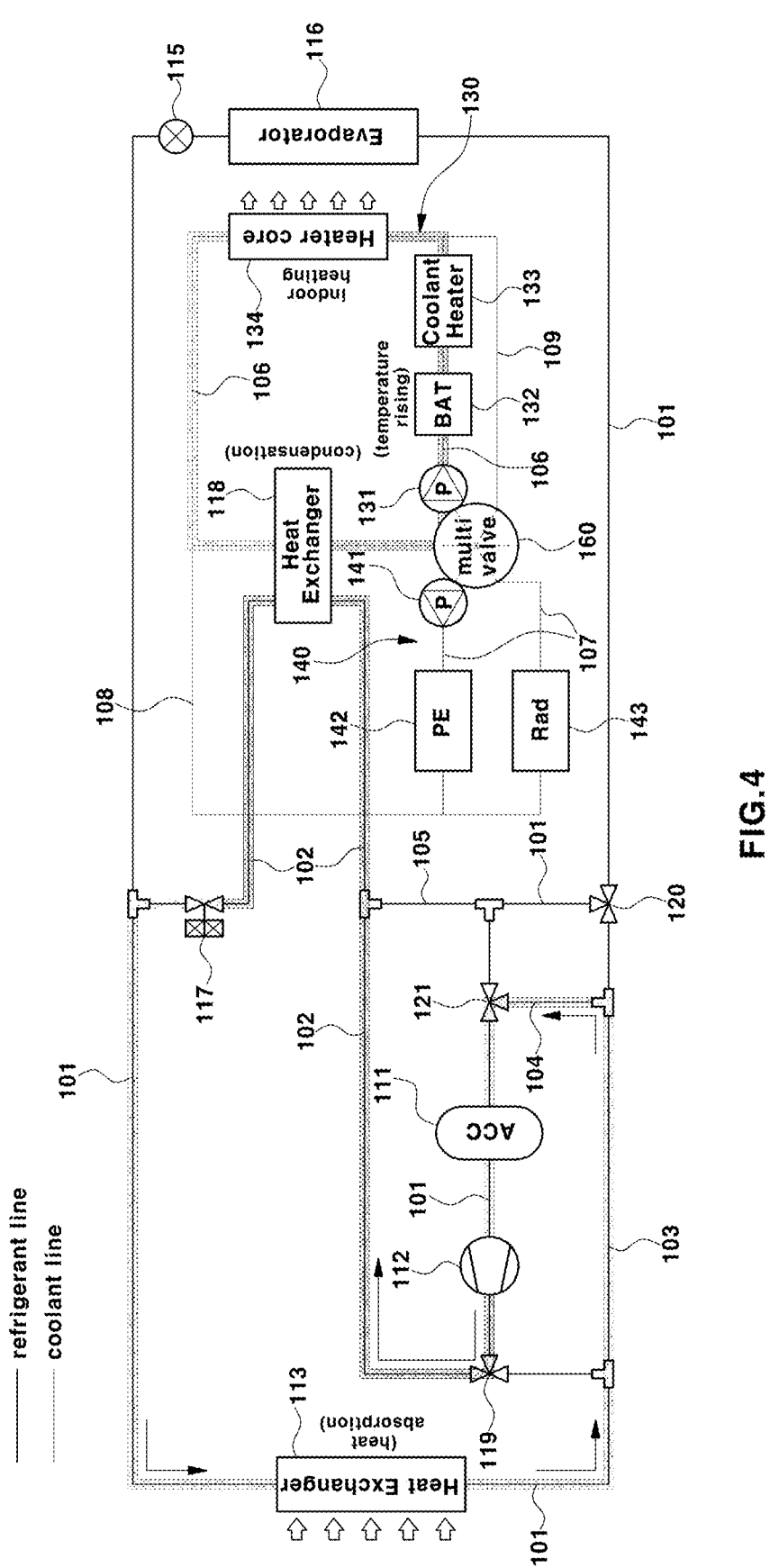
FIGS. 4-7 are views showing operating states according to thermal management modes of a thermal management system according to the present disclosure.

FIG. 4 is a view showing an operating state of a heating mode in which a heat pump (absorbing and supplying heat from outside air) operates. First, explaining a control state of the thermal management system in the heating mode, the compressor 112 may be operated by the controller 100, and accordingly the refrigerant may be compressed at high-temperature and high-pressure by the compressor 112.

Additionally, the cooling fan (the reference numeral '114' in FIG. 3) may be operated by the controller 100, so that the air (outdoor air) sucked by the cooling fan 114 may pass through the external heat exchanger 113.

In addition, the open/closed state of the first control valve 119 may be controlled by the controller 100 so that the all of the high-temperature and high-pressure gaseous refrigerant discharged from the compressor 112 may move to the branch refrigerant line 102 and then pass through the refrigerant-coolant heat exchanger 118.

Along with this, the open/closed states of the second control valve 120 and the third control valve 122 may be controlled by the controller 100, so that the refrigerant passing through the external heat exchanger 113 may move to the refrigerant line 101 through the first branch line 103 and the second branch line 104 and then flow to the accumulator 111.

In addition, the controller 100 may control the first expansion valve 115 to be in a closed state in order to prevent the refrigerant from passing therethrough. Additionally, the controller 100 may control the second expansion valve 117 to be in an open state in order to allow the refrigerant to pass therethrough and expand.

Next, to describe the refrigerant circulation process, when all of the high-temperature and high-pressure gaseous refrigerant discharged from the compressor 112 moves to the branch refrigerant line 102 through the first control valve 119 and then passes through the refrigerant-coolant heat exchanger 118, heat exchange between the refrigerant and the coolant may be performed in the refrigerant-coolant heat exchanger 118 and at this time, the refrigerant may be condensed since heat of the refrigerant is transferred to the coolant. The refrigerant condensed in the refrigerant-coolant heat exchanger 118 may expand to a low-temperature and low-pressure state while passing through the second expansion valve 117.

After that, all of the refrigerant expanded to a low-temperature and low-pressure state in the second expansion valve 117 may flow along the refrigerant line 101 to the external heat exchanger 113 and the refrigerant may absorb heat from the air passing around the external heat exchanger 113 while passing through the external heat exchanger 113.

As such, in the present disclosure, the external heat exchanger 113 may perform the role of an evaporator in which the refrigerant absorbs external heat (heat of air) in the heating mode in which the heat pump is operated. An arrow around the external heat exchanger 113 in FIG. 4 may indicate a state (a heat absorption state of the refrigerant) in which heat is transferred from the air (outdoor air) sucked by the cooling fan (the reference numeral '114' in FIG. 3) to the refrigerant of the external heat exchanger.

As described above, all of the refrigerant absorbing heat in the external heat exchanger 113 may be stored in the accumulator 111 after moving to the accumulator 111 through the first branch line 103 and the second branch line

104 and then may circulate along the circulation path described above again after being compressed to a high-temperature and high-pressure state by the compressor 112.

In addition, the HVAC blower (the reference numeral '150' in FIG. 3) that supplies the air for HVAC to the heater core 134 for heating in the heating mode may be operated by the controller 100 and at the same time, the water pump 131 of the heating system 130 and the coolant heater 133 may be operated by the controller 100.

Accordingly, the coolant may be circulated by the water pump 131 in the heating system 130 and the coolant may sequentially pass through the battery coolant passage provided in the battery 132, the coolant heater 133, the heater core 134, the refrigerant-coolant heat exchanger 118, and the multi-valve 160 in turn while circulating along the coolant line 106.

While the coolant passes through the heater core 134, heat exchange may be performed in the heater core 134 between the coolant passing through the inside and the air for HVAC passing around the surroundings blown by the HVAC blower 150. The air for HVAC heated by the coolant in the heater core 134 may be discharged into the interior of the vehicle, thereby heating the interior of the vehicle. An arrow around the heater core 134 in FIG. 4 may indicate a state in which the air passing through the heater core 134 is supplied into the interior of the vehicle.

In this circulation process, the coolant passing through the heater core 134 may flow along the coolant line to the coolant line connected to the refrigerant-coolant heat exchanger 118 and may exchange heat with the high-temperature and high-pressure refrigerant compressed by the compressor 112 while passing through the refrigerant-coolant heat exchanger 118.

At this time, the coolant may receive the heat of the refrigerant in the refrigerant-coolant heat exchanger 118, and the refrigerant passing through the refrigerant-coolant heat exchanger 118 may be sucked by the water pump 131 and then expelled into the coolant line 106 after passing through the multi-valve 160. Thus, the refrigerant circulates along the circulation path described above again.

The operating state of the heating mode has been described above. As described above, the heat of the outside air absorbed the refrigerant in the external heat exchanger 113, the heat provided by the coolant heater 133, and the heat of the refrigerant compressed at high-temperature and high-pressure by the compressor 112 (the heat by a compressor work) may be used in the heating mode for interior heating and may be used to heat the air for HVAC in the heater core 134.

When only the coolant heater 133 is used as a heat source to heat the battery 132 in winter, it may initially be difficult to secure a sufficient amount of heating calories. Accordingly, in the present disclosure, a heat pump may supplement the coolant heater 133, which would be insufficient on its own, and furthermore the electric energy (HVAC and heating consumption energy) consumed by the coolant heater 133 may be reduced.

More specifically, the low-temperature and low-pressure refrigerant expanded by the second expansion valve 117 in the heating mode may absorb the heat of the outside air while passing through the external heat exchanger 113. Then the heat absorbed by the refrigerant may be transferred to the coolant through the refrigerant-coolant heat exchanger 118, thereby being used to heat the interior of the vehicle. In other words, the heat pump that absorbs and supplies the heat of the outside air using the refrigerant may be operated.

In addition, the heat of the refrigerant compressed at high-temperature and high-pressure by the compressor 112 in the heating mode may be also transferred from the refrigerant-coolant heat exchanger 118 to the coolant, thereby being used for interior heating along with the heat provided by the coolant heater 133.

Accordingly, in the present disclosure, the PTC heater configured as an electric heater and the internal heat exchanger used for heating in winter may be removed from the thermal management system and it may be possible to secure a sufficient heat source for interior heating without the PTC heater and the internal heat exchanger.

In addition, it is possible to increase the all-electric range (AER) per charge in an electric vehicle since it is possible to reduce the electric energy consumed by the PTC heater, specifically, the energy of the HVAC and heating consumption.

Figure 5:
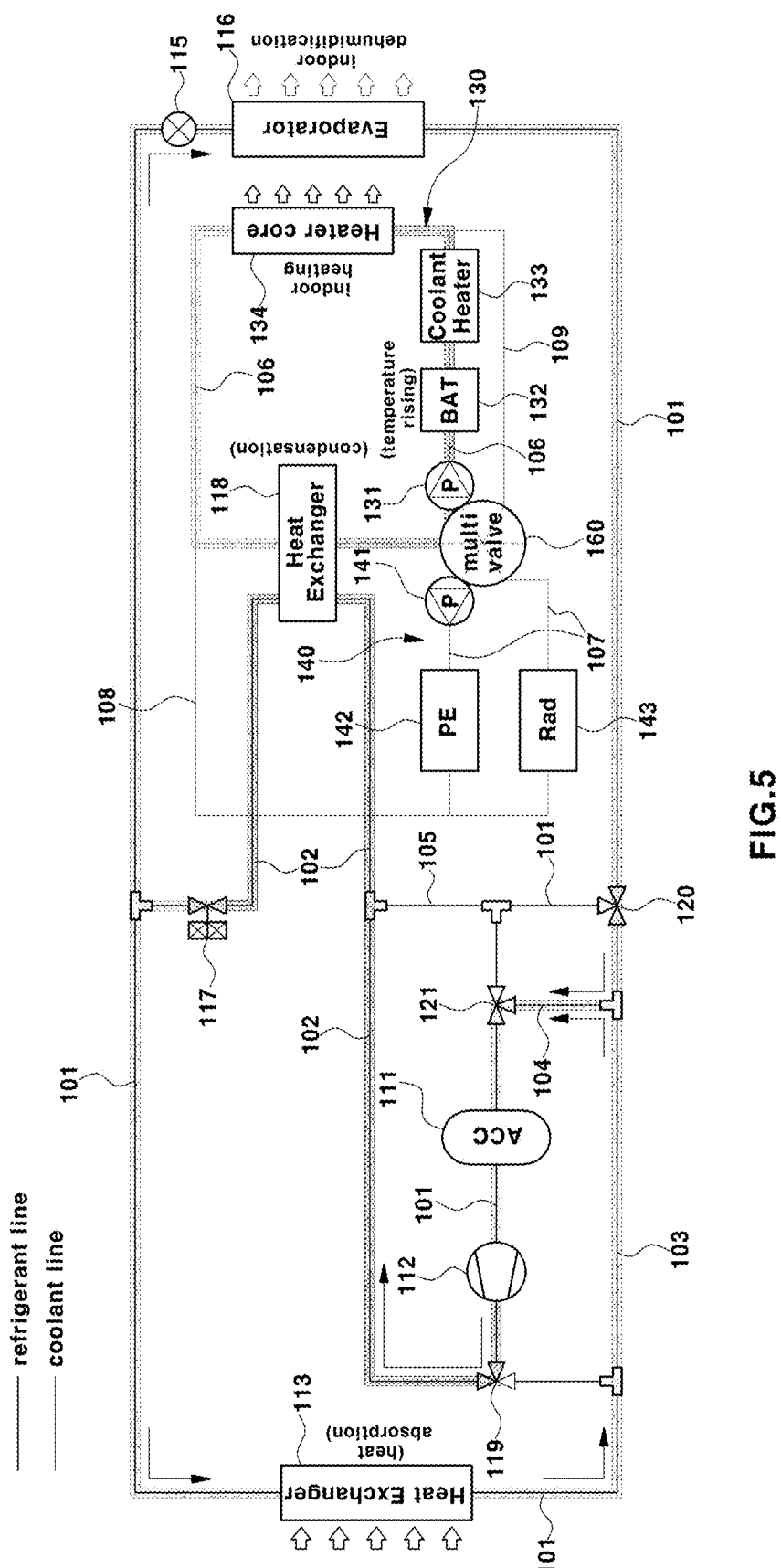

FIG. 5 is a view showing the operating state of a thermal management system simultaneously performing a heating and dehumidifying mode in which heating and dehumidifying are performed. When the heating mode is operated in winter, the interior humidity of the vehicle may change according to the use rate of the interior air inside the vehicle. Accordingly, interior dehumidification may be necessary when the interior humidity increases over time.

Accordingly, the simultaneous heating and dehumidifying mode in which interior heating and interior dehumidification are performed simultaneously is needed. In the case of the simultaneous heating and dehumidifying mode, there is a difference compared to the heating mode in that the refrigerant expanded by the second expansion valve 117 may be distributed to flow to both the external heat exchanger 113 and the evaporator 116, although a heat pump transferring heat while the refrigerant circulates in the order of the compressor 112, the refrigerant-coolant heat exchanger 118, the second expansion valve 117, and the external heat exchanger 113 may be implemented as in the heating mode.

First, describing the control state of the thermal management system in the simultaneous heating and dehumidification mode, the compressor 112 may be operated by the controller 100 and at the same time, the cooling fan (the reference numeral '114' in FIG. 3) may be operated by the controller 100.

Accordingly, the outdoor air sucked by the cooling fan 114 may pass through the external heat exchanger 113. In addition, since the compressor 112 is operated, the refrigerant may be compressed into a high-temperature and high-pressure gaseous refrigerant by the compressor 112.

In addition, the open/closed state of the first control valve 119 may be controlled by the controller 100, so that all of the high-temperature and high-pressure gaseous refrigerant discharged from the compressor 112 moves to the branch refrigerant line 102 and then passes through the refrigerant-coolant heat exchanger 118.

In addition, the open/closed state of the third control valve 122 may be controlled by the controller 100, so that the refrigerant passing through the external heat exchanger 113 moves to the refrigerant line 101 through the first branch line 103 and the second branch line 104 and then flows into the accumulator 111.

In addition, the open/closed state of the second control valve 120 may be controlled by the controller 100, so that the refrigerant passing through the evaporator 116 joins the refrigerant passing through the external heat exchanger 113 in the first branch line 103 and then flows to the accumulator 111 through the second refrigerant line 104.

In addition, both the first expansion valve 115 and the second expansion valve 117 may be controlled to be opened by the controller 100, accordingly the refrigerant passing through the refrigerant-coolant heat exchanger 118 may pass through the second expansion valve 117, and some of the refrigerant passing through the second expansion valve 117 may pass through the first expansion valve 115 and the evaporator 116.

Next, describing the refrigerant circulation process, when all of the high-temperature and high-pressure gaseous refrigerant discharged from the compressor 112 moves to the branch refrigerant line 102 through the first control valve 119 and then passes through the refrigerant-coolant heat exchanger 118, heat exchange between the refrigerant and the coolant may be performed in the refrigerant-coolant heat exchanger 118. At this time the refrigerant may be condensed since heat is transferred to the coolant. As such the refrigerant condensed in the refrigerant-coolant heat exchanger 118 may expand to a low-temperature and low-pressure state while passing through the second expansion valve 117.

After that, the refrigerant expanded to a low-temperature and low-pressure state in the second expansion valve 117 may be distributed to flow to the external heat exchanger 113 and the evaporator 116. The refrigerant moving along the refrigerant line 101 to the external heat exchanger 113 may absorb heat from the outdoor air passing around the exterior of the heat exchanger 113 while passing through the inside of the external heat exchanger 113.

As described above, the external heat exchanger 113 in the present disclosure may perform the role of an evaporator in which the refrigerant absorbs external heat (heat of air) in the simultaneous heating and dehumidifying mode. An arrow around the external heat exchanger 113 in FIG. 5 may indicate a state (a heat absorption state of the refrigerant) in which heat is transferred from the air (outdoor air) sucked by the cooling fan (the reference numeral '114' in FIG. 3) to the refrigerant of the external heat exchanger.

As described above, the refrigerant absorbing heat in the external heat exchanger 113 may be stored in the accumulator 111 after moving to the accumulator 111 through the first branch line 103 and the second branch line 104 and then may circulate the circulation path described above again after being compressed to a high-temperature and high-pressure state by the compressor 112.

In addition, the refrigerant moving along the refrigerant line 101 to the evaporator 116 after expanding to a low-temperature and low-pressure state in the second expansion valve 117 may absorb heat from the air for HVAC passing around the evaporator 116 while passing through the inside of the evaporator 116. An arrow around the evaporator 116 in FIG. 5 may indicate a state in which the air passing through the evaporator 116 is supplied to the interior of the vehicle.

Accordingly, when the air stripped of heat to the refrigerant in the evaporator 116 is discharged into the interior of the vehicle (e.g., discharged to the windshield of the vehicle), the humidity of the heated air supplied to the interior of the vehicle may be controlled. At this time, interior dehumidification may be performed, thereby improving the comfort of the vehicle interior and removing fog.

In addition, the coolant circulation process in the simultaneous heating and dehumidifying mode may be no different from the heating mode. In other words, the HVAC blower (the reference numeral '150' in FIG. 3) that supplies the air for HVAC to the heater core 134 for heating may be operated by the controller 100 and simultaneously the water pump 131 of the heating system 130 and the coolant heater 133 may be operated by the controller 100.

Accordingly, the coolant may be circulated by the water pump 131 in the heating system 130 and may sequentially pass through the battery coolant passage provided in the battery 132, the coolant heater 133, the heater core 134, the refrigerant-coolant heat exchanger 118, and the multi-valve 160 in turn while circulating along the coolant line 106.

While the coolant passes through the heater core 134, heat exchange may be performed between the coolant passing through the inside and the air for HVAC blown by HVAC blower (the reference numeral '150' in FIG. 3) passing around the heater core 134 and the air for HVAC that is heated by the coolant in the heater core 134 may be discharged into the interior of the vehicle, thereby achieving to heat the interior of the vehicle.

In this circulation process, the coolant passing through the heater core 134 may pass through the refrigerant-coolant heat exchanger 118 while flowing along the coolant line 106 and the coolant may exchange heat with the high-temperature and high-pressure refrigerant compressed by the compressor 112 while passing through the refrigerant-coolant heat exchanger 118.

In the refrigerant-coolant heat exchanger 118, the heat of the refrigerant may be transferred to the coolant and the refrigerant passing through the refrigerant-coolant heat exchanger 118 may be sucked by the water pump 131 and be expelled into the coolant line 106 after passing through the multi-valve 160. Thus, the refrigerant circulates along the circulation path described above again.

Figure 6:
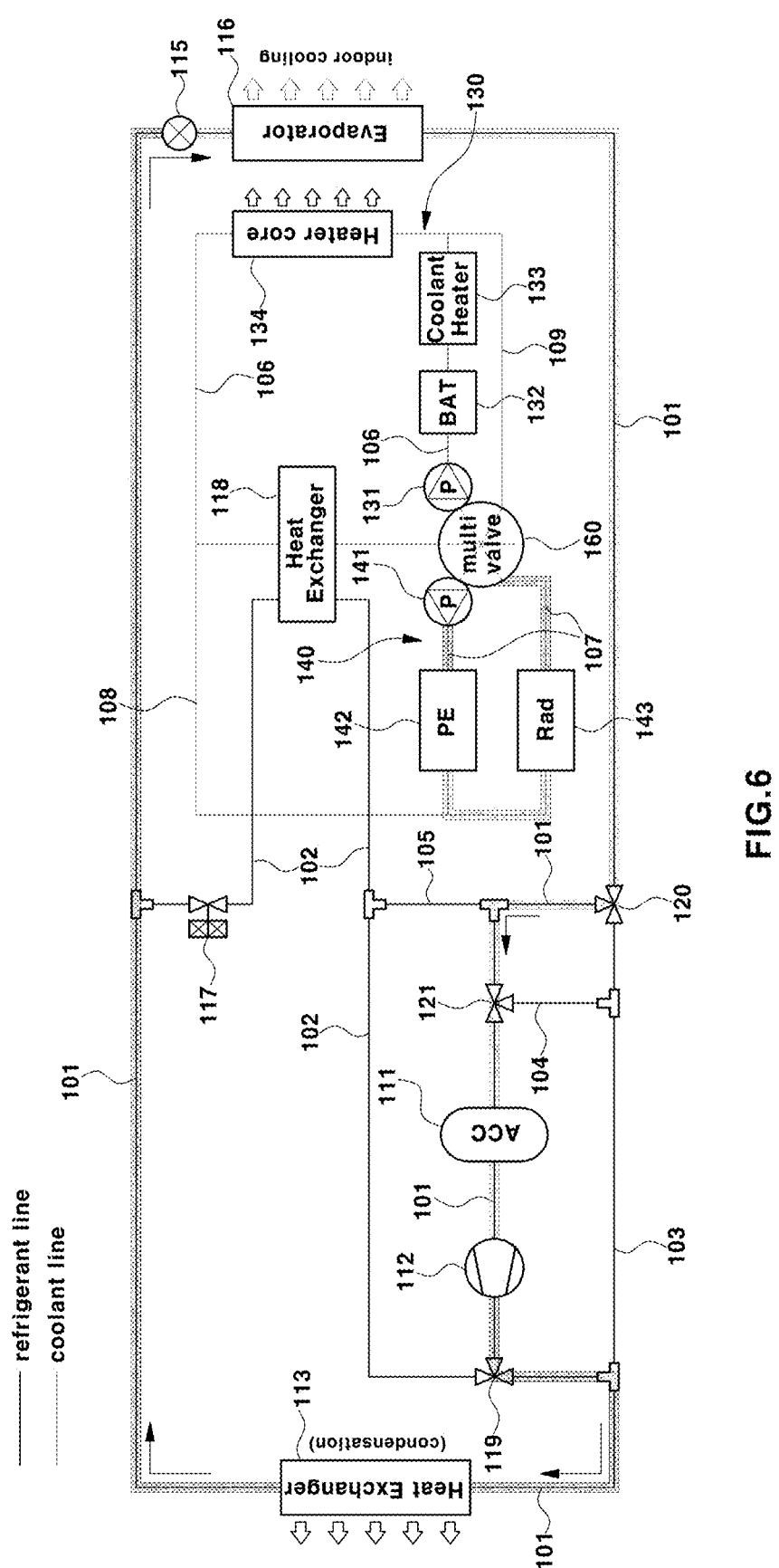

Next, FIG. 6 is a view showing an operating state of the cooling mode in which general interior cooling is performed and indicates a state in which the cooling of the power electronics (PE) system is performed simultaneously with interior cooling.

As shown, the compressor 112 may be operated by the controller 100 and the refrigerant may flow from the accumulator 111 to the path of the compressor 112, the first control valve 119, the external heat exchanger 113, the first expansion valve 115, the evaporator 116, the second control valve 120, and the third control valve 121, and then move back to the accumulator 111.

At this time, the first control valve 119 may be controlled by the controller 100, so that all of the high-temperature and high-pressure refrigerant compressed by the compressor 112 may flow to the external heat exchanger 113. In addition, the first expansion valve 115 may be controlled to be an open state by the controller 100 in order to allow the refrigerant to pass therethrough and expand, and the second expansion valve 117 may be controlled to be in a closed state by the controller 100 in order to prevent the refrigerant from passing therethrough.

In addition, the open/closed states of the second control valve 120 and the third control valve 121 may be controlled by the controller 100, so that all of the refrigerant passing through the evaporator 116 flows along the refrigerant line 101 and then sequentially passes through the second control valve 120 and the third control valve 121 in turn.

In the cooling mode, the HVAC blower (the reference numeral '150' in FIG. 3) may be operated by the controller 100, and the air for HVAC blown by the HVAC blower 150 may pass around the evaporator 116 while the refrigerant expanded to a low-temperature and low-pressure by the first expansion valve 115 passes through the inside of the evaporator 116.

Accordingly, heat exchange between the air for HVAC passing around the evaporator 116 and the refrigerant passing through the inside may be performed in or at the evaporator 116. In this case, the air for HVAC cooled by the refrigerant may be discharged into the interior of the vehicle, thereby cooling the interior of the vehicle. An arrow around the evaporator 116 in FIG. 6 may indicate a state in which the air passing through the evaporator 116 is supplied into the interior of the vehicle.

In such a cooling mode, the external heat exchanger 113 may perform the role of a condenser that condenses the refrigerant through heat exchange between air (outdoor air) and the refrigerant. An arrow around the external heat exchanger 113 in FIG. 6 may indicate a state (a heat dissipation state in which the refrigerant dissipates heat) in which the heat of the refrigerant is transferred to the air (outdoor air) sucked by the cooling fan (the reference numeral '114' in FIG. 3).

In addition, the water pump 141 of the PE thermal management system 140 may be operated by the controller 100, and the open/closed state of the multi-valve 160 may be controlled by the controller 100, so that the coolant in the PE thermal management system 140 circulates only along the PE coolant line 107. In addition, the cooling fan (the reference numeral '114' in FIG. 3) may be operated by the controller 100 and accordingly the air sucked by the cooling fan 114 may pass through the radiator 143.

Accordingly, the coolant may circulate along the PE coolant line 107 sequentially passing through the PE coolant passage, the radiator 143, and the multi-valve 160 and may cool the components or devices 142 of the power electronics (PE) system while passing through the PE coolant passage.

In addition, the coolant that cools the components or devices 142 of the power electronics (PE) system may pass through the multi-valve 160 after dissipating heat to the air while passing through the radiator 143 and then be sucked into and expelled by the water pump 141 in order to circulate along the PE coolant line 107.

Figure 7:
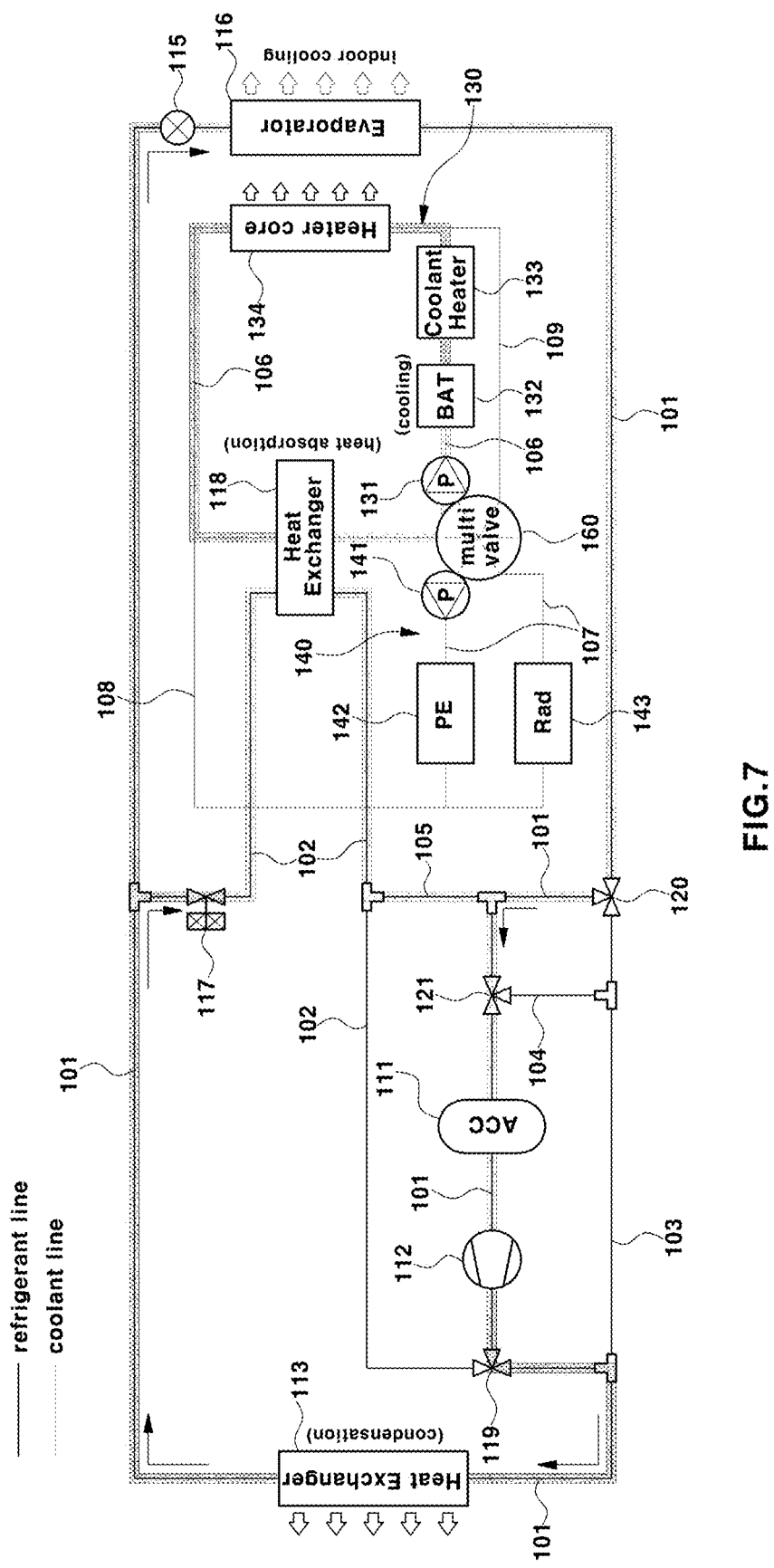

Next, FIG. 7 is a view showing an operating state of a thermal management system in the simultaneous cooling and battery cooling mode in which interior cooling is performed simultaneously with the cooling of the battery. When it is necessary to cool the battery 132 when the (interior) cooling mode is operated, the thermal management system may be switched to and operated in the simultaneous (interior) cooling and battery cooling mode.

In the simultaneous (interior) cooling and battery cooling mode, some of the refrigerant passing through the external heat exchanger 113 may be distributed to the branch refrigerant line 102 and sequentially pass through the second expansion valve 117 and the refrigerant-coolant heat exchanger 118 in turn, thereby cooling the battery 132 while the coolant cooled by the refrigerant in the refrigerant-coolant heat exchanger 118 passes through the battery coolant passage.

To describe the operating state, the compressor 112 may be operated by the controller 100 and accordingly the refrigerant may flow from the accumulator 111 to the path of the compressor 112, the first control valve 119, the external heat exchanger 113, the first expansion valve 115, the evaporator 116, the second control valve 120, and the third control valve 121, and then move back to the accumulator 111.

At this time, the first control valve 119 may be controlled by the controller 100 in order to allow all of the high-temperature and high-pressure refrigerant compressed by the compressor 112 to flow to the external heat exchanger

113. In addition, both the first expansion valve 115 and the second expansion valve 117 may be controlled to be in an open state by the controller 100 in order to allow the refrigerant to pass through and expand.

Accordingly, some of the refrigerant passing through the external heat exchanger 113 may be distributed to the branch refrigerant line 102, and the refrigerant distributed to the branch refrigerant line 102 may sequentially pass through the expansion valve 117 and the refrigerant-coolant heat second exchanger 118 in turn while flowing along the branch refrigerant line 102.

Accordingly, the refrigerant may expand to a low-temperature and low-pressure state in the second expansion valve 117 and then exchange heat with the coolant circulating along the coolant line 106 of the heating system 130 while the low-temperature and low-pressure refrigerant passes through the refrigerant-coolant heat exchanger 118.

The refrigerant passing through the refrigerant-coolant heat exchanger 118 may move to the third branch line 105, move to the refrigerant line 101, join the refrigerant passing through the evaporator 116 and the second control valve 120, pass through the third control valve 121, then move to the accumulator 111 in turn and is circulated by the compressor 112 again.

The open/closed state of the first control valve 119 may be controlled in order to allow all of the refrigerant compressed by the compressor 112 to flow to the external heat exchanger 113, and at this time, since the open/closed state of the second control valve 120 and the third control valve 121 are controlled in order to allow all of the refrigerant passing through the evaporator 116 to flow to the accumulator 111, the refrigerant passing through the refrigerant-coolant heat exchanger 118 may flow to the third branch line 105, and then move from the third branch line 105 to the refrigerant line 101, thereby joining the refrigerant passing through the second control valve 120.

In addition, the water pump 131 of the heating system 130 may be operated by the controller 100 and the opening state of the multi-valve 160 may be controlled by the controller 100 in order to allow the coolant in the heating system 130 to only circulate along the coolant line 106.

In addition, the HVAC blower (the reference numeral '150' in FIG. 3) may be operated by the controller 100 to blow the air for HVAC into the HVAC case, but the operation of a door (not shown) in the HVAC case may be controlled, so that the air for HVAC blown by the HVAC blower 150 inside the HVAC case does not pass through the heater core 134 but only passes through the evaporator 116.

Accordingly, the low-temperature and low-pressure refrigerant passing through the first expansion valve 115 may cool the air for HVAC passing around the evaporator 116 while passing through the inside of the evaporator 116. Accordingly the cooled air for HVAC may be discharged into the interior of the vehicle, thereby cooling an interior of the vehicle. An arrow around the evaporator 116 in FIG. 7 may indicate a state in which the air passing through the evaporator 116 is supplied into the interior of the vehicle.

Accordingly, the external heat exchanger 113 may perform the role of a condenser that condenses the refrigerant through heat exchange between the air (outdoor air) and the refrigerant. An arrow around the external heat exchanger 113 in FIG. 6 may indicate a state (a heat dissipation state in which the refrigerant dissipates heat) in which heat of the refrigerant is transferred to the air (outdoor air) sucked by the cooling fan (the reference numeral '114' in FIG. 3).

At the same time as the interior cooling described above, the coolant cooled by the heat absorption of the refrigerant while passing through the refrigerant-coolant heat exchanger 118 may sequentially pass through the water pump 131, the battery coolant passage provided in the battery 132, the coolant heater 133, and the heater core 134 in turn while circulating along the coolant line 106 of the heating system 130 and in particular, may cool the battery 132 while passing through the battery coolant passage.

While various embodiments of the present disclosure have been described in detail above, the scope of the present disclosure is not limited thereto. Various modifications and improvements made by those of ordinary skill in the art using the basic concepts of the present disclosure defined in the following claims are also included in the scope of the present disclosure.

What is claimed is:

1. A thermal management system of a vehicle, the thermal management system comprising:

a refrigerant circuit including an accumulator, a compressor, a refrigerant-air heat exchanger, a first expansion valve, and an evaporator which are connected to each other via a refrigerant line configured to allow a refrigerant to pass therethrough and circulate between the accumulator, the compressor, the refrigerant-air heat exchanger, the first expansion valve, and the evaporator;

a heating system including a water pump, a coolant heater, and a heater core which are connected to each other via a coolant line configured to allow a coolant to pass therethrough and circulate between the water pump, the coolant heater, and the heater core;

a branch refrigerant line that is branched from the refrigerant line between the compressor and the refrigerant-air heat exchanger and that is connected to the refrigerant line between the refrigerant-air heat exchanger and the first expansion valve;

a refrigerant-coolant heat exchanger connected to the branch refrigerant line and the coolant line of the heating system, wherein heat exchange is performed at the refrigerant-coolant heat exchanger between the refrigerant flowing along the branch refrigerant line and the coolant flowing along the coolant line;

a second expansion valve that is installed on the branch refrigerant line between the refrigerant-coolant heat exchanger and the refrigerant-air heat exchanger; and a first control valve that is installed at a branch point where the branch refrigerant line is branched from a refrigerant line between the compressor and the refrigerant-air heat exchanger.

2. The thermal management system of claim 1, wherein the second expansion valve is installed in the branch refrigerant line between the refrigerant-coolant heat exchanger and a branch point where the branch refrigerant line is branched from the refrigerant line between the refrigerant-air heat exchanger and the first expansion valve.

3. The thermal management system of claim 1, further comprising:

a first branch line that is branched from a refrigerant line between the evaporator and the accumulator and that is connected to the refrigerant line between the compressor and the refrigerant-air heat exchanger;

a second control valve that is installed at a branch point where the first branch line is branched from the refrigerant line;

a second branch line that is branched from the refrigerant line between the second control valve and the accumulator and that is connected to the first branch line; and a third control valve that is installed at a branch point where the second branch line is branched from the refrigerant line.

4. The thermal management system of claim 3, further comprising:

a third branch line that is branched from the branch refrigerant line between the refrigerant-coolant heat exchanger and the first control valve and that is connected to the refrigerant line between the second control valve and the third control valve.

5. The thermal management system of claim 4, further comprising:

a controller configured to control operations of the first expansion valve, the second expansion valve, the first control valve, the second control valve, and the third control valve.

6. The thermal management system of claim 5, wherein, in a simultaneous heating and dehumidifying mode, the controller is configured to:

control an open/closed state of the first control valve in order to allow all of the refrigerant compressed by the compressor to move to the branch refrigerant line and pass through the refrigerant-coolant heat exchanger, control both the first expansion valve and second expansion valve to be in an open state in order to allow the refrigerant passing through the refrigerant-coolant heat exchanger to be distributed to flow to the refrigerant-air heat exchanger and the evaporator after expanding while passing through the second expansion valve, and operate the water pump of the heating system, a cooling fan that passes air through the refrigerant-air heat exchanger, and an HVAC blower that blows air to pass through the heater core and the evaporator.

7. The thermal management system of claim 6, wherein, in the simultaneous heating and dehumidifying mode, the controller is configured to control an open/closed state of the second control valve and the third control valve, so that the refrigerant passing through the refrigerant-air heat exchanger and the refrigerant passing through the evaporator and the second control valve join at the third branch line and then move to the refrigerant line through the third control valve.

8. The thermal management system of claim 1, further comprising:

a controller configured to control operations of the first expansion valve, the second expansion valve, and the first control valve, wherein, in a heating mode, the controller is further configured to:

control an opening state of the first control valve in order to allow all of the refrigerant compressed by the compressor to move to the branch refrigerant line and pass through the refrigerant-coolant heat exchanger, control the first expansion valve to be in a closed state in order to prevent the refrigerant from passing through, control the second expansion valve in order to allow the refrigerant to pass therethrough and expand, and operate the water pump of the heating system, a cooling fan that passes air through the refrigerant-air heat exchanger, and an HVAC blower that blows air to pass through the heater core.

9. The thermal management system of claim 1, further comprising:

a controller configured to control operations of the first expansion valve, the second expansion valve, and the first control valve, wherein, in a cooling mode, the controller is further configured to:

control an open/closed state of the first control valve in order to allow all of the refrigerant compressed by the compressor to move along the refrigerant line and pass through the refrigerant-air heat exchanger, control the first expansion valve in order to allow the refrigerant to pass therethrough and expand, control the second expansion valve to be in a closed state in order to prevent the refrigerant from passing therethrough, and operate a cooling fan that passes air through the refrigerant-air heat exchanger and an HVAC blower that blows air to pass through the evaporator while the refrigerant circulates in a path of the accumulator, the compressor, the refrigerant-air heat exchanger, the first expansion valve, and the evaporator.

10. The thermal management system of claim 1, further comprising:

a power electronics thermal management system that includes: a water pump connected via a power electronics coolant line in order to allow the coolant to pass therethrough and circulate; a power electronics coolant passage provided in a component or device of a power electronic system; and a radiator.

11. The thermal management system of claim 10, further comprising:

a coolant connection line that connects the heating system and the power electronics thermal management system, wherein the coolant connection line is branched from the coolant line between the heater core and the refrigerant-coolant heat exchanger and is connected to the power electronics coolant line between the power electronics coolant passage and the radiator.

12. The thermal management system of claim 11, further comprising:

a coolant branch line that is branched from the coolant line between the coolant heater and the heater core; and a valve device that is connected to the coolant branch line, the coolant line connected from the refrigerant-coolant heat exchanger, an inlet side of the water pump of the heating system, an inlet side of the water pump of the power electronics thermal management system, and the power electronics coolant line of a radiator outlet side connected from the radiator of the power electronics thermal management system, wherein the valve device is configured to selectively perform connection between the coolant branch line, the coolant line, the inlet side of the water pump of the heating system, the inlet side of the of water pump of the power electronics thermal management system, and the power electronics coolant line.

13. The thermal management system of claim 1, further comprising:

a battery coolant passage provided in a battery to allow the coolant to pass through for thermal management of the battery, wherein the battery coolant passage is connected to the coolant line of the heating system and the coolant circulating along the coolant line passes through the battery coolant passage.

14. The thermal management system of claim 13, further comprising:

a controller configured to control operations of the first expansion valve, the second expansion valve, and the first control valve, wherein, in a simultaneous cooling and battery cooling mode, the controller is further configured to:

control an open/closed state of the first control valve in order to allow all of the refrigerant compressed by the compressor to move along the refrigerant line and pass through the refrigerant-air heat exchanger, control the first expansion valve and the second expansion valve in order to allow the refrigerant to pass therethrough and expand, and operate the water pump of the heating system, a cooling fan that passes air through the refrigerant-air heat exchanger, and an HVAC blower that blows air to pass through the evaporator while the refrigerant circulates in a path of the accumulator, the compressor, the refrigerant-air heat exchanger, the first expansion valve, and the evaporator and in a path of the branch refrigerant line and the refrigerant-coolant heat exchanger.

* * * * *